Feb. 8, 1966 P. S. ROGERS ET AL 3,233,591
EXTENSIBLE REEL TYPE ANIMAL LEASH
Filed Oct. 21, 1963
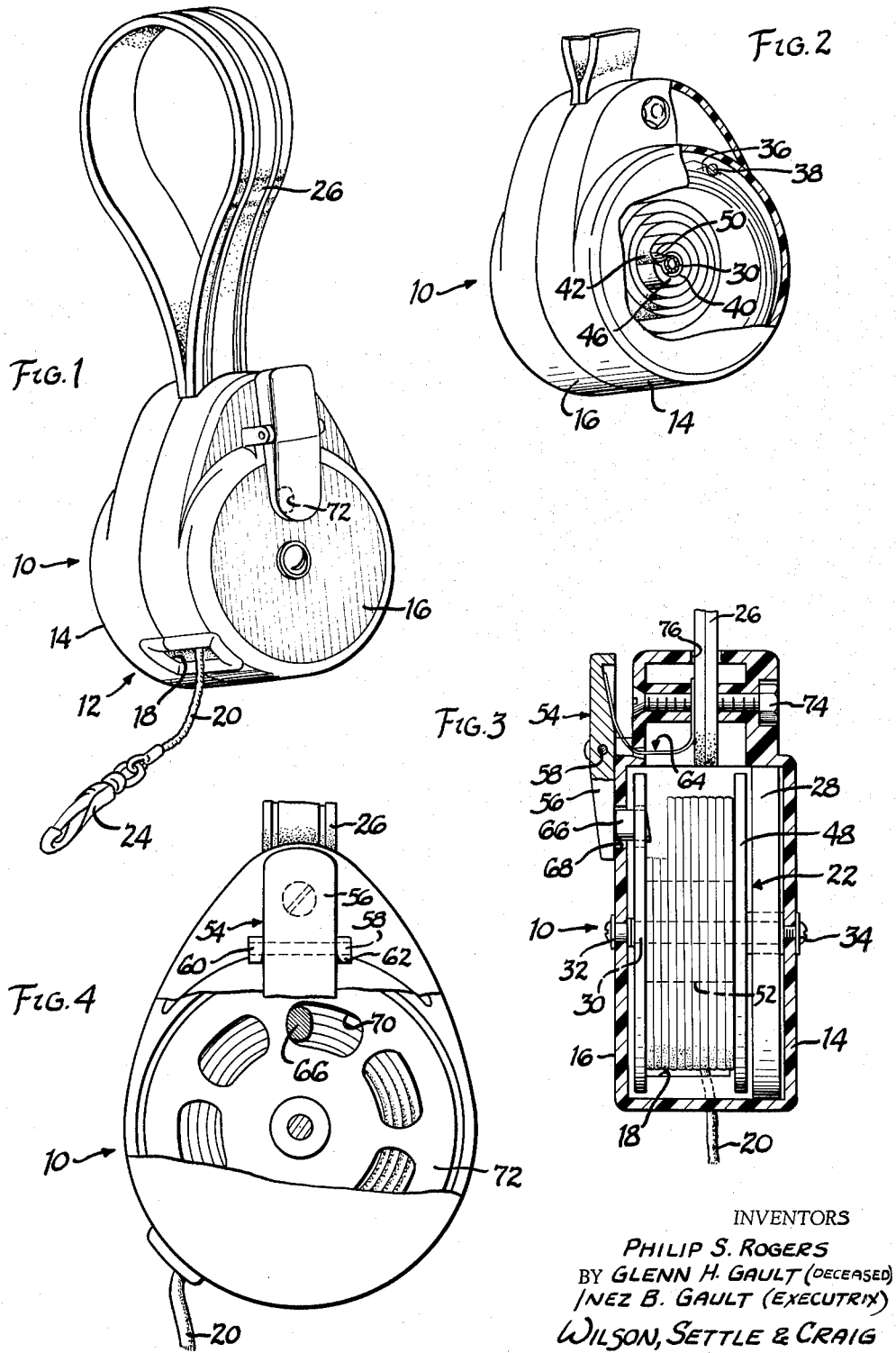
INVENTORS
PHILIP S. ROGERS
BY GLENN H. GAULT (DECEASED)
INEZ B. GAULT (EXECUTRIX)
WILSON, SETTLE & CRAIG
ATTORNEYS 3,233,591
EXTENSIBLE REEL TYPE ANIMAL LEASH
Philip S. Rogers, 3283 Salem, Trenton, Mich., and Glenn H. Gault, deceased, late of Ashland, Ohio, by Inez B. Gault, executrix, Ashland, Ohio; said Inez B. Gault assignor to said Rogers
Filed Oct. 21, 1963, Ser. No. 317,830
1 Claim. (Cl. 119—109)

This invention relates to an extensible animal leash, and more particularly to an extensible leash which is compact in size so as to be easily held in the hand of the user while still permitting the use of a relatively long leash.

It is an object of the invention to provide a novel extensible animal leash, particularly useful for tethering dogs.

Another object of the invention is to provide an extensible leash wound on a reel contained within a casing, the reel being urged to retract the leash by a spiral spring which is also mounted within the casing.

A further object of the invention is to provide such an arrangement in which the spiral spring is positioned on one side of the reel rather than within the hub of the reel.

Another object of the invention is to provide a brake for the reel, the brake being operative to normally maintain the reel against rotation.

A still further object of the invention is to provide a brake having an oval-shaped pin for engagement with the reel, the pin extending through an oval-shaped opening in the casing and into engagement with one of a plurality of circular oblong shaped openings in one side of the reel, the oval shape of the various openings preventing cold flow and breakdown or yield of the casing and reel material against which the pin abuts.

Another object of the invention is to provide a configuration of one end of the spiral spring for securement to the hub of the reel, the configuration of the spring preventing disengagement thereof with the reel.

A yet further object of the invention is to provide a flexible looped strap attached to the casing for engagement with the wrist, the looped strap being attached to the casing by means of a casing screw which also secures a brake spring to the casing.

Other objects of this invention will appear in the following description and appended claim, reference being had to the accompanying drawing forming a part of this specification wherein like reference characters designate corresponding parts in the several views.

In the drawing:

FIGURE 1 is a perspective view of an extensible animal leash in accordance with one embodiment of the present invention;

FIGURE 2 is a view of the device shown in FIGURE 1 with a portion of the casing broken away to show the spiral spring and the connection thereof with the hub of the reel;

FIGURE 3 is a sectional view taken through the brake lever of the device of FIGURE 1; and FIGURE 4 is a view of the device of FIGURE 1 showing the engagement of the brake pin with the reel.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to FIGURES 1 and 3, the extensible animal leash 10 comprises a casing 12, preferably fabricated from a plastic material. The casing 12 is formed of two casing halves 14, 16. An opening 18 is provided in the casing for extension therefrom of a flexible leash 20. It will be noted that the opening 18 has an oblong shape. The oblong shape permits sideward movement of the leash as it is wound onto or off a reel 22, also preferably fabricated from plastic, which is positioned within the casing. A spring clip 24 is provided on the outer end of the leash for attachment to, for example, a dog's collar.

A looped strap 26 is attached to the casing. In use of the device, the strap 26 is received on the wrist while the casing 12 is grasped in the hand. The strap length is such that the fingers and thumb will be in a position at the rear of the casing to operate a brake lever 56.

Referring to FIGURES 2 and 3, it will be noted that the reel 22 and a spiral spring 28 are located within the casing 12 in side-by-side relationship. An axle 30 extends through the center of the casing and reel to rotatably mount the reel 22. Each end of the axle 30 is internally threaded to threadingly receive screws 32, 34 which extend through openings in the casing wall. This arrangement maintains the casing halves together.

The outer end of the spiral spring 28 is recessed at 36 and held in place by a split rivet 38. The inner end of the spring 28 is turned to form a hook 40 to engage the axle 30. Adjacent to the hook 40 is an oppositely turned portion 42. This configuration forms an S-shape. A hub 46 extends from one side wall 48 of the reel. The hub 46 has a slot 50 which is received on the turned portion 42 of the spring 28. Rotation of the reel in one direction thus results in winding the spring 28. Winding of the spring results when the leash 20 is unwound from the reel. The S-shape of the inner end of the spring is advantageous in that it provides an interlocking relationship between the hub 46 and axle 30. This interlocking relationship prevents disengagement of the spring from the hub. It frequently happens that when the winding action of the spring is suddenly stopped, the inertia of the spring will cause disengagement with the hub if the spring is connected to the hub alone. However, the inertial force tending to drive the spring out of the slot 50 of the hub is resisted by the engagement of the hook 40 with the axle 30.

The side-by-side arrangement of the spring 28 and reel 22 results in several advantages. Firstly, this arrangement permits an overall smaller size of the casing 12. In conventional reel-driven arrangements, the spring is located within a central opening of the reel. It will be appreciated that in such an arrangement the overall diameter of the spring and reel must be approximately twice that of the present construction. With the spring and reel positioned as shown, a relatively large diameter reel may be used while still maintaining the desired small size of the casing. A larger reel size results in a greater depth from the reel axial portion 52 to the outer periphery of the reel. This permits the entire length of a relatively long leash 20 to be wound on the reel while still being below the outer periphery of the reel when entirely wound thereon. This arrangement helps to avoid excessive layer build-up along either wall of the spool which can reach the casing walls and stop the reel rotation.

Referring to FIGURES 3 and 4, it will be noted that a brake 54 is provided to engage the reel 22 and prevent rotation thereof. The brake is applied after the desired length of the leash has been unwound. Thereafter, the pull of an animal will not cause additional unwinding of the leash. The brake comprises a lever 56 which is pivotally mounted externally of the casing 12 by means of a pin 58 which is received in a pair of projections 60, 62 provided on the casing exterior. One end of the lever 56 is constantly urged outwardly by a U-shaped flat spring 64. The other end of the lever has a downwardly projecting pin 66 which extends through an opening 68 in the casing and into engagement with one of the peripherally spaced openings 70 in the side wall 72 of the reel. This arrangement effectively locks the reel against rotation. It will be noted that the cross-sectional configuration of the brake pin 66 and the configuration of the openings 68, 70 is circular oblong. A circular oblong configuration is advantageous in that it permits relatively large surface contact between the pin 66 and the casing 12 and side wall 72. If the pin or the openings were of a circular configuration, only straight line contact would be obtained. Straight line contact places relatively high stress on the portions of the material contacted, it being appreciated that the reel and associated parts are under a relatively high load and speed. This high stress may cause cold flow of the material of the casing or reel. As previously mentioned, these components are preferably fabricated from a plastic material. Cold flow causes weakening of these members and eventual failure. Distribution of the forces over a wider surface area substantially eliminates cold flow. To further increase the strength of the structure, the lever 56 and brake pin 66 are preferably fabricated from a metal.

Referring to FIGURE 3, it will be noted that the strap 26, brake spring 64 and casing halves 14, 16 are secured together by a single nut and bolt assembly 74. The bolt extends through openings in the casing and inner ends of the strap. The inner strap ends extend through an opening 76 in the casing. An opening is provided in one end of the U-shaped spring 64 to secure this end of the spring to the casing. The other end of the spring is free and exerts a spring pressure against the brake lever as previously mentioned.

In operation of the leash 10, the user first secures the spring clip 24 to the animal's collar. The user then extends his hand through the loop 26 and grasps the rear of casing 12. The brake lever 56 is then depressed and the desired amount of leash 20 is unwound from the reel. The brake lever 56 is then released whereupon the brake pin 66 engages the reel 22 to prevent further unwinding of the leash. When it is desired to retract the leash, the brake lever is again depressed. The force exerted by the spiral spring 28 is normally not sufficient to draw the animal back. Ordinarily, the user will move towards the animal to create slack in the leash whereupon the spiral spring 28 will rotate the reel 22 to wind in the leash. Slack may also be created by movements of animal. If the brake lever is maintained in the depressed position, the animal will be able to range, at will, to the extreme long and short lengths of the leash, and the leash will have a constant tension, preventing slack and tangling.

Having thus described our invention, we claim:

An extensible animal leash comprising a casing, an axle in the casing, a reel rotatably mounted on the axle, a leash wound on the reel, said casing having an opening through which the leash extends, a spiral spring in the casing adjacent to one side of the reel, the spring being secured to the casing at its outer end, the inner end of the spring being bent in an S-shape to form an outer hook and an inner hook adjacent thereto, the outer hook engaging the axle, a hub projecting from the reel towards the spring, said hub having a slot, said inner hook of the spring being received in said slot to drive the reel in a direction to wind up the leash, and a manually releasable brake on the casing normally locking the reel against rotation.

References Cited by the Examiner
UNITED STATES PATENTS

| 1,090,015 | 3/1914 | Birchbauer | 33—217 |
| 2,217,323 | 10/1940 | Sackett | 242—98 |
| 2,250,171 | 7/1941 | Wilkins | 242—98 |
| 2,314,504 | 3/1943 | Lifchultz | 119—96 |
| 2,776,644 | 1/1957 | Fontaine | 119—109 |
| 2,919,676 | 1/1960 | Schneider | 119—109 |

SAMUEL KOREN, *Primary Examiner.*

ALDRICH F. MEDBERY, *Examiner.*